United States Patent
Chikama et al.

(10) Patent No.: US 10,208,926 B2
(45) Date of Patent: Feb. 19, 2019

(54) VEHICULAR LAMP

(71) Applicant: STANLEY ELECTRIC CO., LTD., Tokyo (JP)

(72) Inventors: Hiroyuki Chikama, Tokyo (JP); Ryusuke Sasanuma, Tokyo (JP); Koichiro Ano, Tokyo (JP); Hidetaka Okada, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/848,081

(22) Filed: Dec. 20, 2017

(65) Prior Publication Data
US 2018/0180260 A1 Jun. 28, 2018

(30) Foreign Application Priority Data
Dec. 22, 2016 (JP) .................. 2016-249511

(51) Int. Cl.
| F21S 43/145 | (2018.01) |
| F21S 43/19 | (2018.01) |
| B60Q 1/26 | (2006.01) |
| F21V 15/01 | (2006.01) |
| B60Q 1/00 | (2006.01) |

(Continued)

(52) U.S. Cl.
CPC .......... F21V 15/012 (2013.01); B60Q 1/0052 (2013.01); B60Q 1/2607 (2013.01); B60Q 1/2642 (2013.01); F21S 43/145 (2018.01); F21S 43/19 (2018.01); F21S 43/241 (2018.01); F21V 3/02 (2013.01); *F21Y 2105/16* (2016.08); *F21Y 2115/20* (2016.08)

(58) Field of Classification Search
CPC .......... F21V 2200/00–2200/40; B60Q 1/2607; F21S 43/235–43/241; F21S 43/249; F21S 43/145; F21S 43/14; H05B 35/00; G02B 6/0066–6/0073; F21Y 2113/00–2113/20
See application file for complete search history.

(56) References Cited

U.S. PATENT DOCUMENTS

| 2013/0049570 A1 | 2/2013 | Natsume |
| 2015/0257235 A1 | 9/2015 | Ito et al. |

(Continued)

FOREIGN PATENT DOCUMENTS

| DE | 102015219081 A1 | 4/2016 |
| EP | 3009300 A1 | 4/2016 |
| JP | 2015-170806 A | 9/2015 |

OTHER PUBLICATIONS

The extended European Search Report for the related European Patent Application No. 17208935.1 dated Apr. 6, 2018.

*Primary Examiner* — Mariceli Santiago
(74) *Attorney, Agent, or Firm* — Kenealy Vaidya LLP

(57) ABSTRACT

A vehicular lamp including: a surface emitting light source including a front surface that includes a light-emitting surface, and a rear surface on the side opposite thereto; a transparent member including a light incident surface, a light exit surface from which light entering from the light incident surface exits, a light guide portion for guiding the light entering from the light incident surface to the light exit surface, and a holding portion for holding the surface emitting light source; and a light source that emits light which enters from the light incident surface, is guided to the light exit surface by the light guide portion, and exits from the light exit surface.

14 Claims, 12 Drawing Sheets

(51) Int. Cl.
F21S 43/241 (2018.01)
F21V 3/02 (2006.01)
F21Y 115/20 (2016.01)
F21Y 105/16 (2016.01)

(56) References Cited

U.S. PATENT DOCUMENTS

| | | |
|---|---|---|
| 2016/0040847 A1 | 2/2016 | Ikuta et al. |
| 2016/0102833 A1 | 4/2016 | Ito et al. |
| 2016/0320027 A1 | 11/2016 | Ito et al. |
| 2017/0059113 A1* | 3/2017 | Gloss ................... F21S 48/211 |

* cited by examiner

FIG. 2A
FIG. 2B
FIG. 2C
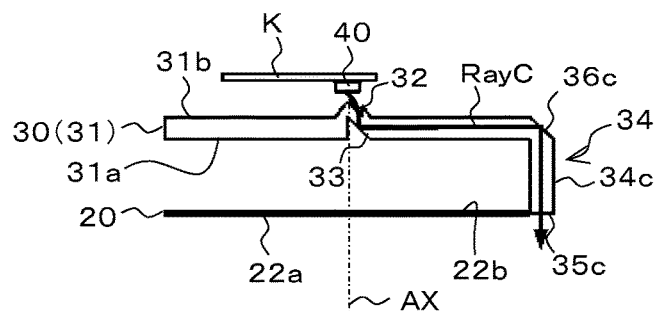
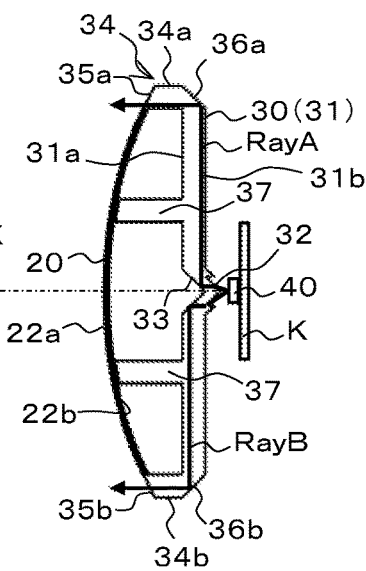

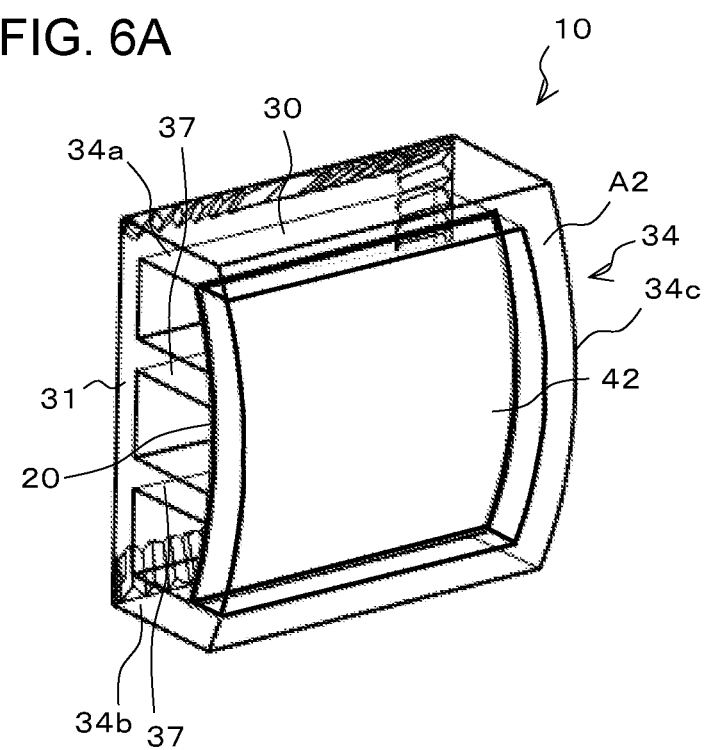

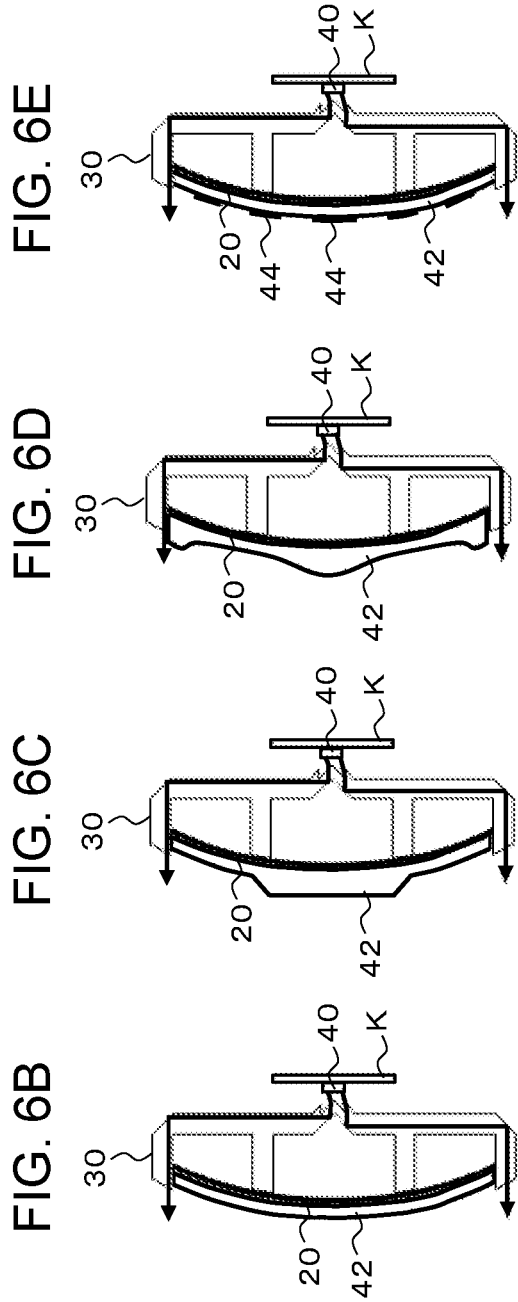

FIG. 8A
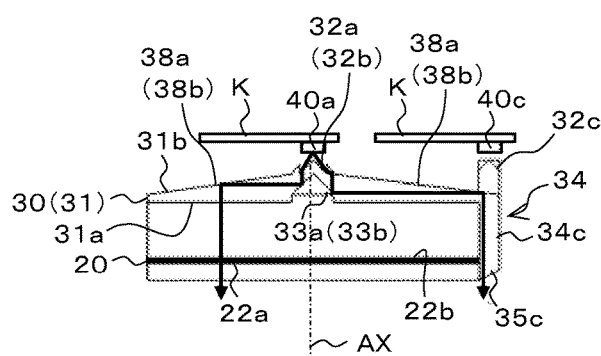
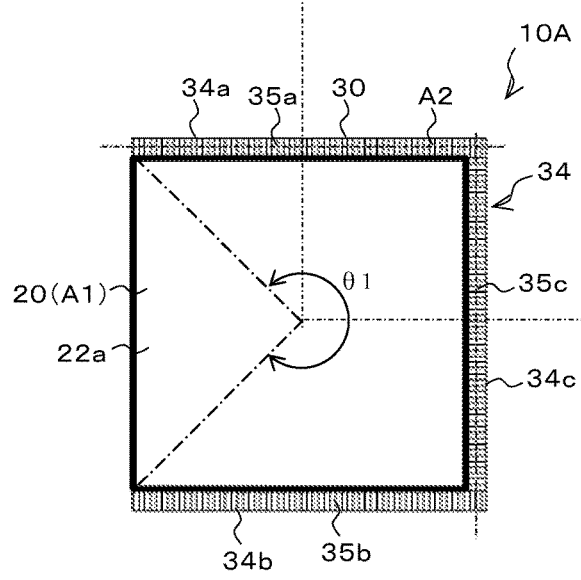
FIG. 8C
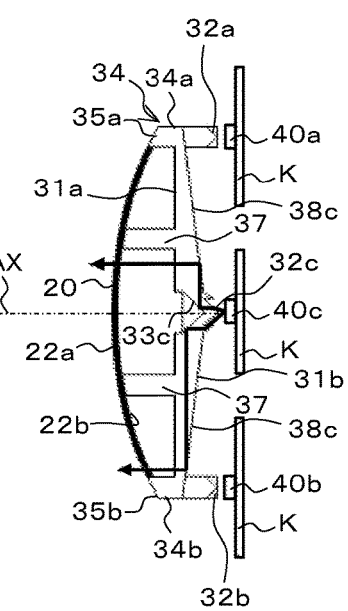
FIG. 8B

VEHICULAR LAMP

CROSS-REFERENCE TO RELATED APPLICATION

This application is based upon and claims the benefit of priority of the prior Japanese Patent Application No. 2016-249511,filed on Dec. 22, 2016, the entire contents of which are incorporated herein by reference.

FIELD

The present invention relates to a vehicular lamp, and more particularly to a vehicular lamp including a surface emitting light source (for example, an organic EL panel) and a holding member for holding the surface emitting light source.

BACKGROUND

A vehicular lamp including an organic EL panel and a holding member for holding the organic EL panel has been heretofore suggested (see, for example, Japanese Patent Application Publication No. 2015-170806 (FIGS. 5A to 5D, FIG. 7, etc.)).

SUMMARY

However, a problem associated with the vehicular lamp disclosed in Japanese Patent Application Publication No. 2015-170806 is that, although it is possible to realize a single lamp (for example, tail lamp) function, in order to realize another lamp (for example, stop lamp) function, it is necessary to add separately a configuration from which light exits for realizing the other lamp function.

The present invention has been created with the foregoing in view, and it is an object of the present invention to provide a vehicular lamp including a surface emitting light source (for example, an organic EL panel) and a holding member for holding the surface emitting light source, in which a plurality of lamp functions is realized without separately adding a configuration from which light exits for realizing a different lamp function.

In order to achieve the above object, one aspect of the present invention provides a vehicular lamp including: a surface emitting light source including a front surface that includes a light-emitting surface, and a rear surface on the side opposite thereto; a transparent member including a light incident surface, a light exit surface from which light entering from the light incident surface exits, a light guide portion for guiding the light entering from the light incident surface to the light exit surface, and a holding portion for holding the surface emitting light source; and a light source that emits light which enters from the light incident surface, is guided to the light exit surface by the light guide portion, and exits from the light exit surface.

According to this aspect, in a vehicular lamp including a surface emitting light source (for example, an organic EL panel) and a holding member for holding the surface emitting light source, it is possible to realize a plurality of lamp functions without separately adding a configuration from which light exits for realizing another lamp function.

This is because the transparent member serves as a holding portion for holding the surface emitting light source and a configuration (mainly, a light exit surface) for realizing another lamp function.

In a preferred embodiment of the present invention, the transparent member includes a transparent plate including a front surface and a rear surface on the side opposite thereto; the surface emitting light source is disposed in front of the transparent member in a state in which the rear surface of the surface emitting light source and the front surface of the transparent plate are opposite each other; and the front surface of the transparent plate is provided with a first extension portion extending forward from the front surface and having a distal end portion provided with the light exit surface.

Further, in a preferred embodiment of the present invention, the front surface of the transparent plate is further provided with a second extension portion extending forward from the front surface and having a distal end portion in contact with the rear surface of the surface emitting light source.

Further, in a preferred embodiment of the present invention, the surface emitting light source is held in a state in which at least a part of an end portion of the surface emitting light source is in contact with the first extension portion, and the rear surface of the surface emitting light source is in contact with the distal end portion of the second extension portion.

Further, in a preferred embodiment of the present invention, one of the front surface and the rear surface of the transparent plate is provided with the light incident surface, and the other of the front surface and the rear surface of the transparent plate is provided with a first reflecting surface that internally reflects the light from the light source, which has entered from the light incident surface, toward an edge portion of the transparent plate; the edge portion of the transparent plate is provided with a second reflecting surface that internally reflects the reflected light from the first reflecting surface toward the light exit surface; and the first reflecting surface, the transparent plate, the second reflecting surface, and the first extension portion function as the light guide portion.

Further, in a preferred embodiment of the present invention, the surface emitting light source is held in a bent state.

Further, in a preferred embodiment of the present invention, the surface emitting light source has flexibility.

Further, in a preferred embodiment of the present invention, the surface emitting light source is opaque.

Further, in a preferred embodiment of the present invention, the light exit surface is disposed along at least a part of an outer shape of the surface emitting light source.

Further, in a preferred embodiment of the present invention, the vehicular lamp further includes an additional transparent member that is held on the transparent member in a state of covering the light-emitting surface of the surface emitting light source.

BRIEF DESCRIPTION OF DRAWINGS

FIG. 2A is a transverse sectional view, FIG. 2B is a front view, and FIG. 2C is a longitudinal sectional view of the vehicular lamp 10;

FIGS. 6A to 6E each illustrate an example of a vehicular lamp 10 provided with an additional transparent member;

FIG. 8A is a top view, FIG. 8B is a front view, and FIG. 8C is a side view of the vehicular lamp 10A;

DESCRIPTION OF EMBODIMENTS

Figure 1:
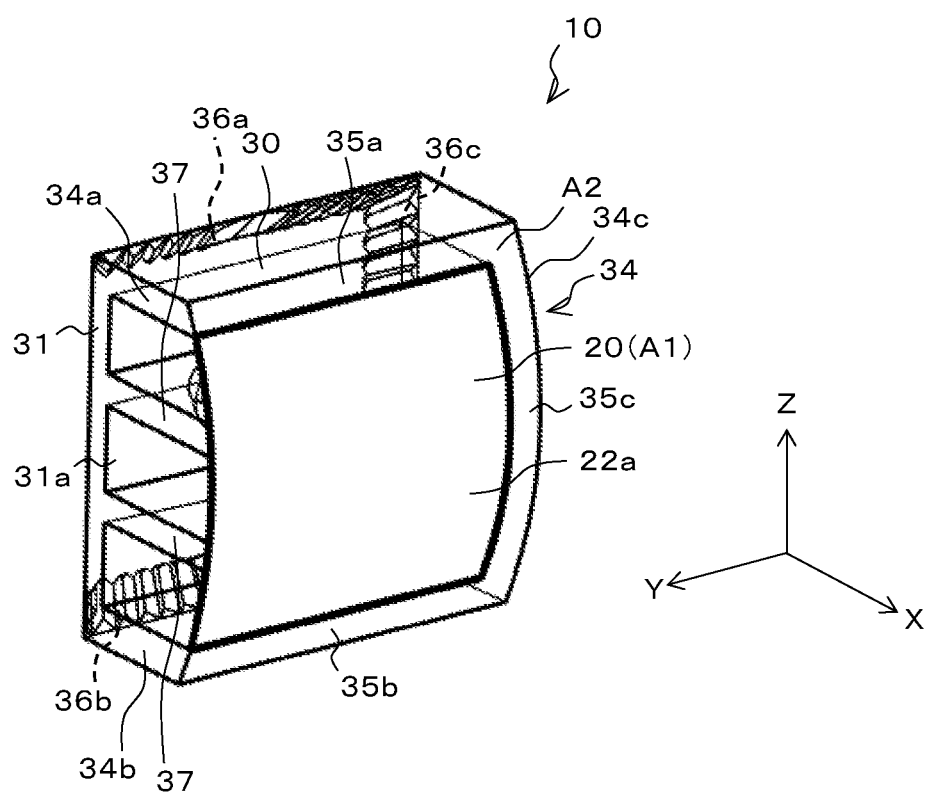
FIG. 1 is a perspective view of a vehicular lamp 10 as viewed from the front side.

Hereinafter, a vehicular lamp 10, which is an embodiment of the present invention, will be described with reference to the accompanying drawings. Corresponding components in the figures are assigned with the same reference numerals, and redundant explanation thereof is omitted.

FIG. 1 is a perspective view of the vehicular lamp 10 as viewed from the front side. FIG. 2A is a transverse sectional view of the vehicular lamp 10, FIG. 2B is a front view, and FIG. 2C is a longitudinal sectional view.

The vehicular lamp 10 illustrated in FIG. 1 is an indicator lamp (or a signal lamp) functioning as a tail lamp and a stop lamp, and is mounted on the left side and the right side of the rear end portion of a vehicle (not illustrated). For convenience of explanation, XYZ axes are defined below. The X axis extends in the vehicle longitudinal direction, the Y axis extends in the vehicle width direction, and the Z axis extends in the vertical direction.

As illustrated in FIG. 1 and FIGS. 2A to 2C, the vehicular lamp 10 of the present embodiment includes an organic EL panel 20, a transparent member 30, a light source 40 and the like. Although not illustrated, the vehicular lamp 10 is disposed in a lamp chamber composed of an outer lens and a housing, and is attached to the housing or the like.

As illustrated in FIG. 2B, the vehicular lamp 10 includes a rectangular light-emitting region A1 and a substantially U-shaped light-emitting region A2 when viewed from the front side. The light-emitting region A2 is arranged in a state of surrounding the light-emitting region A1 (the three (upper, lower, and right) sides in FIG. 2B) in a U-shape. The organic EL panel 20 (light-emitting surface 22a) constitutes the light-emitting region A1, and the U-shaped light exit surfaces (light exit surfaces 35a, 35b, 35c) of the transparent member 30 constitute the light-emitting region A2.

The organic EL panel 20 is a flexible organic EL panel (surface emitting light source) having flexibility. The organic EL panel 20 includes a front surface including the light-emitting surface 22a that emits red light and a rear surface 22b on the opposite side. The outer shape of the organic EL panel 20 (light-emitting surface 22a) is, for example, a rectangular shape. The organic EL panel 20 is disposed in front of the transparent member 30 in a state in which the rear surface 22b of the organic EL panel 20 and the front surface 31a of the transparent plate 31 are opposed to each other.

The thickness of the organic EL panel 20 is, for example, about 0.1 mm to 2.0 mm. For example, an organic EL panel which is disclosed in Japanese Patent Application Laid-open No. 2015-170806 and has a structure in which an anode layer that is a transparent conductive film (for example, ITO), a slightly reflective metal layer, an organic EL light-emitting layer, and a cathode layer which is a conductive film on the back side are laminated between a front resin substrate which is wholly or partly transparent and a rear resin substrate can be used as the flexible organic EL panel 20.

The organic EL panel 20 may be a transparent organic EL panel or an opaque organic EL panel. Further, a surface emitting light source such as an inorganic EL panel may be used instead of the organic EL panel.

As illustrated in FIGS. 2A to 2C, the transparent member 30 (light guide member) includes the transparent plate 31 including the front surface 31a and the rear surface 31b on the opposite side therefrom. The transparent plate 31 has a rectangular outer shape corresponding to the outer shape of the organic EL panel 20.

A light incident surface 32 is provided substantially at the center of the rear surface 31b of the transparent plate 31.

The light incident surface 32 is configured as a surface that collimates (converts into light parallel to a reference axis AX) the light from the light source 40 that enters the transparent plate 31 from the light incident surface 32. The reference axis AX extends in the X axis direction.

A first reflecting surface 33 is provided substantially at the center of the front surface 31a of the transparent plate 31, that is, at a portion facing the light incident surface 32.

The first reflecting surface 33 is configured as a surface performing radial internal reflection (total reflection) of the light from the light source 40, which has entered the transparent plate 31 from the light incident surface 32, to the edge portion of the transparent plate 31 (in the present embodiment, the upper edge portion, the lower edge portion, and the right edge portion in FIG. 2B).

Specifically, the first reflecting surface 33 is provided in a range of an angle θ1 (see FIG. 2B) and configured as a surface performing radial internal reflection of the light from the light source 40 incident on the first reflecting surface 33 in the range of the angle θ1.

A U-shaped extension portion 34 which extends forward (X axis direction) from the edge portion of the front surface 31a (in the present embodiment, the upper edge portion, the lower edge portion, and the right edge portion in FIG. 2B) and is provided with light exit surfaces 35a, 35b, 35c at the distal ends thereof is provided on the front surface 31a of the transparent plate 31. The U-shaped extension portion 34 corresponds to the first extension portion of the present invention.

Specifically, as illustrated in FIGS. 2B and 2C, on the upper edge portion of the front surface 31a of the transparent plate 31, there is provided an upper edge extension portion 34a which extends forward from the upper edge portion and is provided with the light exit surface 35a at the distal end portion.

Further, as illustrated in FIGS. 2B and 2C, on the lower edge portion of the front surface 31a of the transparent plate 31, there is provided a lower edge extension portion 34b which extends forward from the lower edge portion and is provided with the light exit surface 35b at the distal end portion.

Furthermore, as illustrated in FIGS. 2A and 2B, on the right edge portion of the front surface 31a of the transparent plate 31, there is provided a right edge extension portion 34c which extends forward from the right edge portion and is provided with the light exit surface 35c at the distal end portion.

The upper edge extension portion 34a, the lower edge extension portion 34b, and the right edge extension portion 34c constitute the U-shaped extension portion 34.

The light exit surfaces 35a, 35b, 35c are arranged along the outer shape of the organic EL panel 20 (in the present embodiment, the upper side, the lower side, and the right side of the organic EL panel 20 in FIG. 2B). The light exit surfaces 35a, 35b, 35c constitute a U-shaped light exit surface.

Lens cutting is performed on the light exit surfaces 35a, 35b, 35c so as to control the light exiting from the light exit surfaces 35a, 35b, 35c and satisfy the light distribution standard of the stop lamp. Where the light distribution standard of the stop lamp is satisfied even without performing lens cutting, the lens cutting may be omitted.

Second reflecting surfaces 36a, 36b, 36c for internally reflecting the reflected light from the first reflecting surface 33 toward the U-shaped light exit surfaces (light exit surfaces 35a, 35b, 35c) are provided at the edge portion (in the present embodiment, the upper edge portion and the lower edge portion in FIG. 2C and the right edge portion in FIG. 2A) of the rear surface 31b of the transparent plate 31.

More specifically, as illustrated in FIG. 2C, the second reflecting surface 36a for internally reflecting reflected light RayA from the first reflecting surface 33 toward the light exit surface 35a is provided at the upper edge portion of the rear surface 31b of the transparent plate 31. The second reflecting surface 36a is configured as a multiple parabolic surface (a surface in which a plurality of paraboloids of revolution with different F values is arranged in a plane with a focus being at the light source 40 or in the vicinity thereof) in order to convert the light RayA from the first reflecting surface 33 which is incident on the second reflecting surface 36a into light rays parallel to the reference axis AX.

Further, as illustrated in FIG. 2C, the second reflecting surface 36b for internally reflecting reflected light RayB from the first reflecting surface 33 toward the light exit surface 35b is provided at the lower edge portion of the rear surface 31b of the transparent plate 31. The second reflecting surface 36b is configured as a multiple parabolic surface (a surface in which a plurality of paraboloids of revolution with different F values is arranged in a plane with a focus being at the light source 40 or in the vicinity thereof) in order to convert the light RayB from the first reflecting surface 33 which is incident on the second reflecting surface 36b into light rays parallel to the reference axis AX.

Furthermore, as illustrated in FIG. 2A, the second reflecting surface 36c for internally reflecting reflected light RayC from the first reflecting surface 33 toward the light exit surface 35c is provided at the right edge portion of the rear surface 31b of the transparent plate 31. The second reflecting surface 36c is configured as a multiple parabolic surface (a surface in which a plurality of paraboloids of revolution with different F values is arranged in a plane with a focus being at the light source 40 or in the vicinity thereof) in order to convert the light RayC from the first reflecting surface 33 which is incident on the second reflecting surface 36c into light rays parallel to the reference axis AX.

The first reflecting surface 33, the transparent plate 31, the second reflecting surfaces 36a, 36b, 36c, and the U-shaped extension portion 34 (the upper edge extension portion 34a, the lower edge extension portion 34b, the right edge extension portion 34c) correspond to the light guide portion of the present invention.

As illustrated in FIG. 1 and FIG. 2C, an intermediate extension portion 37 which extends forward from the front surface 31a and contacts with the rear surface 22b of the organic EL panel 20 is provided at the front surface 31a of the transparent plate 31 (at two positions in FIG. 2C). The intermediate extension portion 37 corresponds to the second extension portion of the present invention.

It should be noted that the intermediate extension portion 37 is not limited to the front surface 31a of the transparent plate 31 and may be provided anywhere, provided that the intermediate extension portion does not block the reflected light from the first reflecting surface 33 traveling through the transparent plate 31 and the reflected light from the second reflecting surfaces 36a, 36b, 36c traveling through the U-shaped extension portion 34.

Figure 3A:
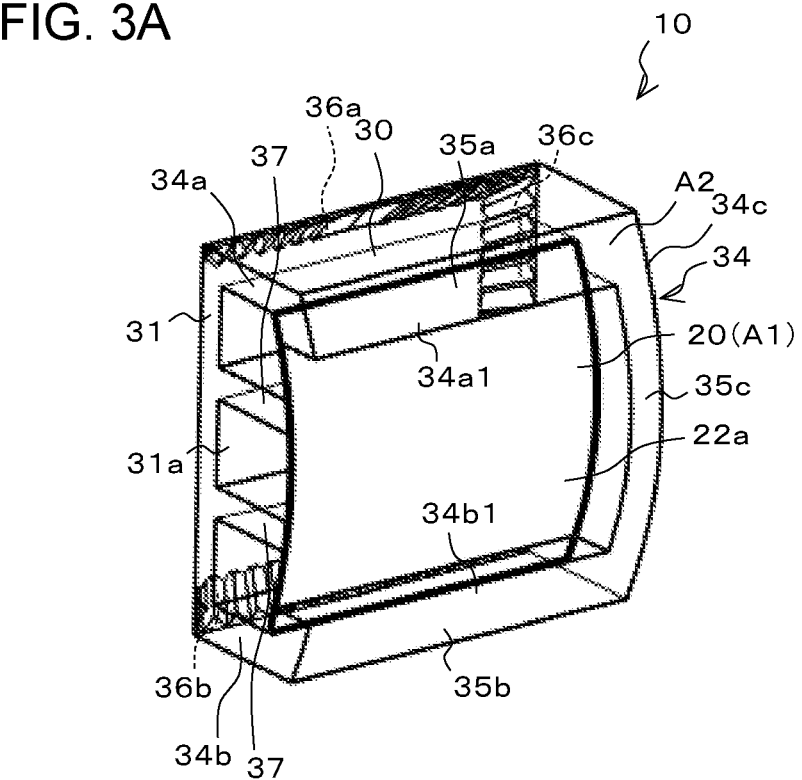
FIGS. 3A and 3B each illustrate an example of a holding unit that holds an organic EL panel 20.
Figure 3B:
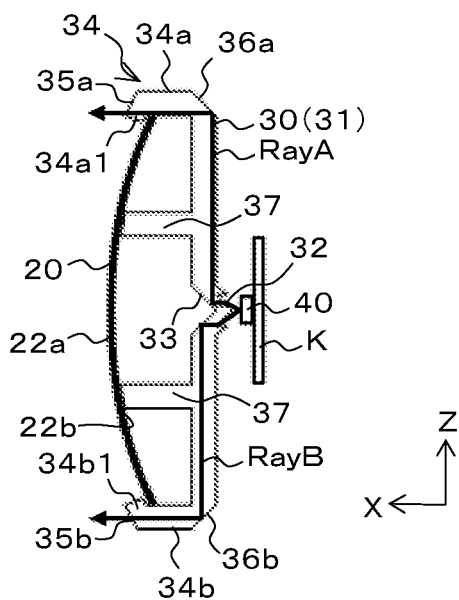
Figure 4A:
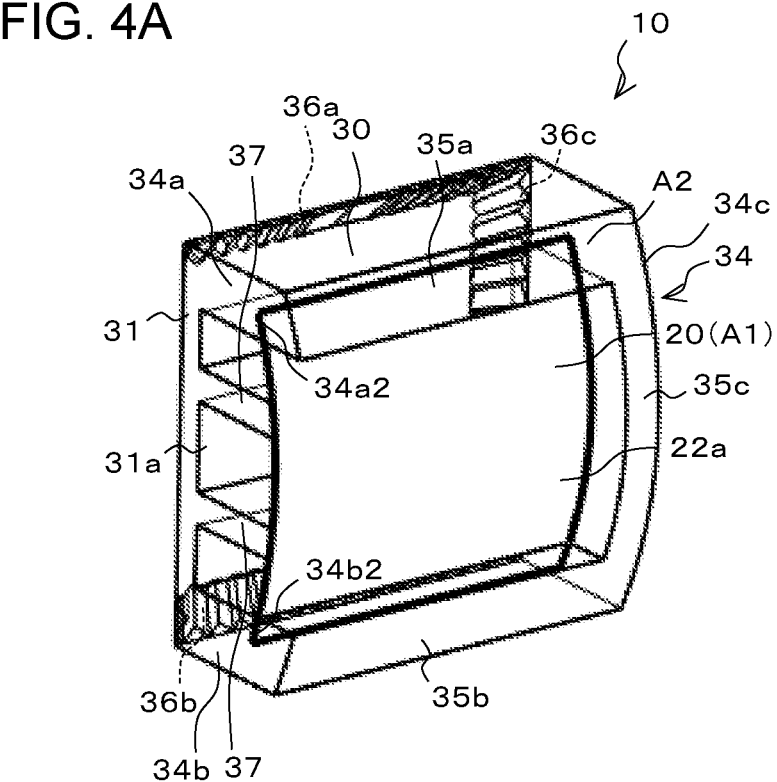
FIGS. 4A and 4B each illustrate another example of a holding unit that holds the organic EL panel 20.
Figure 4B:
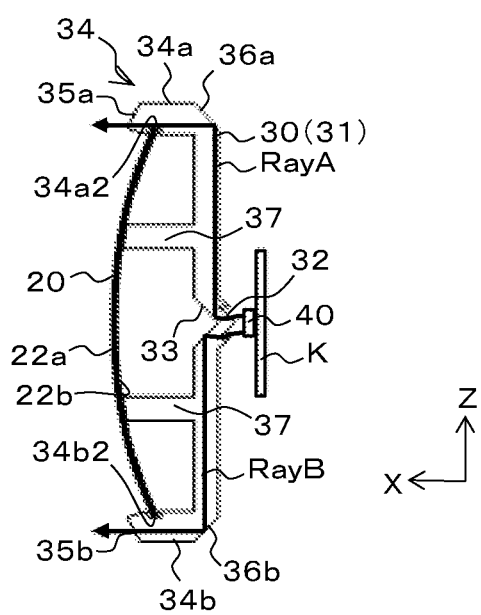

FIGS. 3A and 3B each illustrate an example of a holding unit for holding the organic EL panel 20, and FIGS. 4A and 4B each illustrate another example of a holding unit for holding the organic EL panel 20.

In the organic EL panel 20, the EL panel 20 is held (fixed) at the transparent member 30 in a state where the end portion of the organic EL panel 20 (in the present embodiment, the upper end portion and the lower end portion in FIG. 2B) is in contact with the U-shaped extension portion 34, and the rear surface 22b of the organic EL panel 20 is in contact with the distal end portion of the intermediate extension portion 37.

Specifically, as illustrated in FIGS. 3A and 3B, the EL panel 20 is held (fixed) at the transparent member 30 in a state where a first holding portion 34a1 provided at the distal end portion of the upper edge extension portion 34a is in contact with the upper edge portion of the front surface (light-emitting surface 22a) of the EL panel 20, and a second holding portion 34b1 provided at the distal end portion of the lower edge extension portion 34b is in contact with the lower edge portion of the front surface (light-emitting face 22a) of the organic EL panel 20, and the distal end portion of the intermediate extension portion 37 is in contact with the rear surface 22b of the organic EL panel 20. In this case, the first holding portion 34a1 and the second holding portion 34b1 mainly constitute the holding portion 50.

Alternatively, as illustrated in FIGS. 4A and 4B, the organic EL panel 20 is held (fixed) at the transparent member 30 in a state where the upper end portion thereof is inserted (for example, fitted) into a first groove portion 34a2 provided at the distal end portion of the upper edge extension portion 34a, the lower end portion thereof is inserted (for example, fitted) into a second groove portion 34b2 provided at the lower edge extension portion 34b, and the rear surface 22b is in contact with the distal end portion of the intermediate extension portion 37. In this case, the first groove portion 34a2 and the second groove portion 34b2 mainly constitute the holding portion 50.

The organic EL panel 20 and the transparent member 30 may be bonded to each other with an adhesive in the contact zone thereof.

The first holding portion 34a1 and the second holding portion 34b1 (the same also applies to the first groove portion 34a2 and the second groove portion 34b2) may be located anywhere, provided that they are portions that do not block the reflected light from the first reflecting surface 33 that travels in the transparent plate 31 and the reflected light from the second reflecting surfaces 36a, 36b, 36c that travels in the U-shaped extension portion 34.

The organic EL panel 20 is held on the transparent member 30 in a bent state as a result of the distal end portion of the intermediate extension portion 37 being in contact with the rear surface 22b of the organic EL panel 20.

For example, as illustrated in FIG. 3B and FIG. 4B, the organic EL panel 20 is held in a state of being bent convexly forward by making the size of the intermediate extension portion 37 in the X axis direction larger than that of the U-shaped extension portion 34 (upper edge extension portion 34a, lower edge extension portion 34b, and right edge extension portion 34c).

FIGS. 5A to 5D each illustrate another example of the organic EL panel 20 held in a bent state.

Figure 5A:
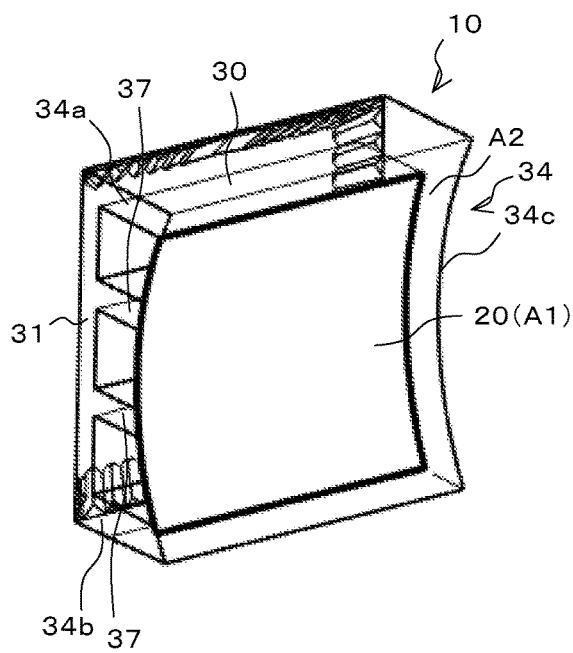
FIGS. 5A to 5D each illustrate another example of the organic EL panel 20 held in a bent state.
Figure 5B:
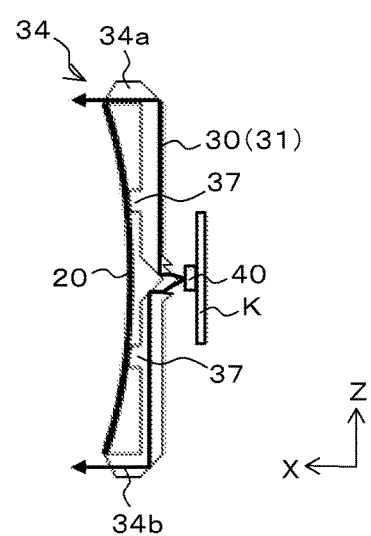

Further, for example, as illustrated in FIGS. 5A and 5B, the organic EL panel 20 is held in a state of being bent concavely forward by making the size of the intermediate extension portion 37 in the X axis direction smaller than that of the U-shaped extension portion 34.

Figure 5C:
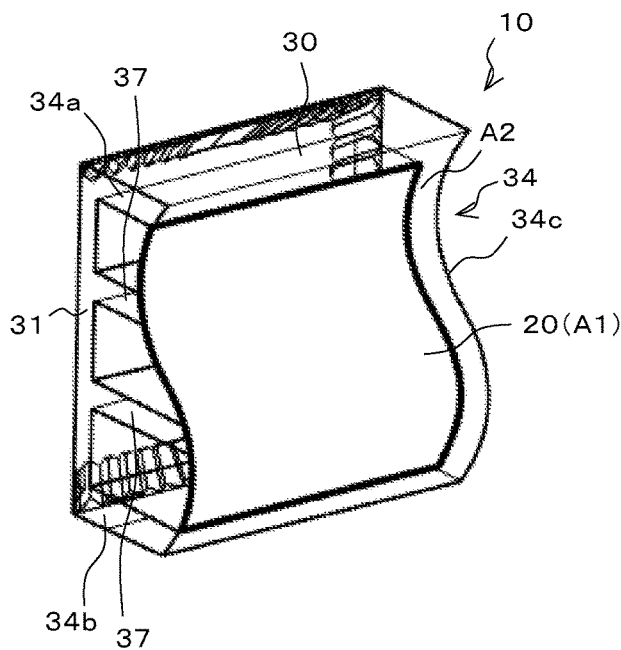
Figure 5D:
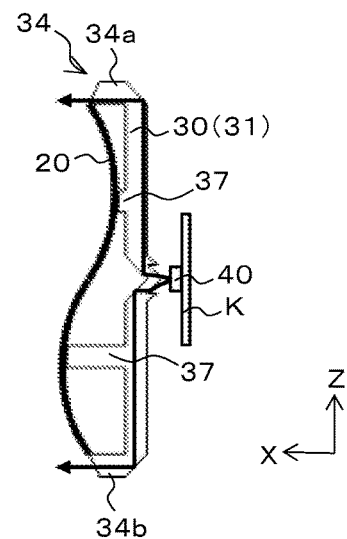

Further, for example, as illustrated in FIGS. 5C and 5D, the organic EL panel 20 is held in a bent state in an S shape by making the size of one intermediate extension portion 37 in the X axis direction smaller than that of the U-shaped extension portion 34 and making the size of the other intermediate extension portion 37 in the X axis direction larger than that of the U-shaped extension portion 34.

As described above, the organic EL panel 20 can be held on the transparent member 30 in various bent states by adjusting the size of the intermediate extension portion 37 in the X axis direction.

The transparent member 30 having the abovementioned configuration is formed by, for example, injection molding of a transparent resin such as an acrylic resin or a polycarbonate resin by using a mold.

The light source 40 is a semiconductor light-emitting element such as a LED or LD in which light enters from the light incident surface 32 and is guided by the first reflecting surface 33, the transparent plate 31, the second reflecting surfaces 36a, 36b, 36c, and the U-shaped extension portion 34 (the upper edge extension portion 34a, the lower edge extension portion 34b, and the right edge extension portion 34c) to the light exit surfaces 35a, 35b, 35c, and the light (red light) exiting from the light exit surfaces 35a, 35b, 35c is emitted. The light source 40 is mounted on a substrate K, and is fixed to a housing or the like in a state where the light source 40 (light-emitting surface) and the light incident surface 32 are opposed to each other.

In the vehicular lamp 10 having the abovementioned configuration, where the light source 40 is turned on, light (red light) from the light source 40 enters from the light incident surface 32 of the transparent member 30 and is then internally reflected radially by the first reflecting surface 33 toward the upper edge portion, the lower edge portion, and the right edge portion of the transparent plate 31, and is further internally reflected by the second reflecting surfaces 36a, 36b, 36c toward the light exit surfaces 35a, 35b, 35c. As a result, the light exits from the U-shaped light exit surface (light exit surfaces 35a, 35b, 35c) and is radiated forward. A stop lamp is thus realized.

Meanwhile, when the organic EL panel 20 is caused to emit light, light (red light) from the organic EL panel 20 (light-emitting surface 22a) is radiated forward. A tail lamp is thus realized.

As described above, according to the present embodiment, in the vehicular lamp 10 including the organic EL panel 20 and the transparent member 30 (holding member) for holding the organic EL panel 20, it is possible to realize a plurality of lamp (a tail lamp and a stop lamp in this embodiment) functions without separately adding a configuration from which light exits for realizing another lamp function.

This is because the transparent member 30 serves as the holding portion 50 for holding the organic EL panel 20 (for example, the first holding portion 34a1 and the second holding portion 34b1 illustrated in FIGS. 3A and 3B) and the configuration (mainly the light exit surfaces 35a, 35b, 35c) for realizing another lamp function.

Further, according to the present embodiment, the organic EL panel 20 can be held on the transparent member 30 in a bent state.

This can be done because, firstly, the organic EL panel 20 is flexible, and secondly, the end portion (in the present embodiment, the upper end portion and the lower end portion in FIG. 2B) of the organic EL panel 20 contacts the U-shaped extension portion 34 (in the present embodiment, the upper edge extension portion 34a and the lower edge extension portion 34b), and the distal end portion of the intermediate extension portion 37 contacts the rear surface 22b of the organic EL panel 20.

Further, according to the present embodiment, the light source 40, the light incident surface 32, the intermediate extension portion 37, and the like are disposed on the rear surface 22b side of the organic EL panel 20, and are covered with the organic EL panel 20. Therefore, it is possible to prevent the light source 40, the light incident surface 32, the intermediate extension portion 37, and the like from being visible from the front (in particular, when an opaque organic EL panel is used as the organic EL panel 20).

Next, a modification example will be described.

FIGS. 6A to 6E each illustrate an example of the vehicular lamp 10 provided with an additional transparent member 42.

As illustrated in FIGS. 6A to 6E, the additional transparent member 42 that is held on the transparent member 30 may be provided in a state of covering the light-emitting surface 22a of the organic EL panel 20. As a result, it is possible to improve the appearance of the organic EL panel 20 when it is turned on and turned off. The additional transparent member 42 is held on the transparent member 30 with an adhesive or the like.

The thickness of the additional transparent member 42 may be uniform, as illustrated in FIG. 6B, or nonuniform, as illustrated in FIGS. 6C and 6D. Further, the entire front (or rear) surface of the additional transparent member 42 or part thereof may be textured. Furthermore, any light-emitting shape may be formed by covering a part of the front surface (or the rear surface) of the additional transparent member 42 with a light-shielding member 44 (paint or the like) as illustrated in FIG. 6E.

Although not illustrated, the organic EL panel 20 may be held by sandwiching the EL panel 20 between the first additional transparent member provided in front of the organic EL panel 20 (the light-emitting surface 22a) and the second additional transparent member provided in the rear of the organic EL panel 20 (the rear surface 22b).

FIG. 7 and FIGS. 8A to 8C each illustrate an example (modification example) of the vehicular lamp 10A using three light sources 40a, 40b, 40c corresponding to the three extension portions 34a, 34b, 34c.

Figure 7:
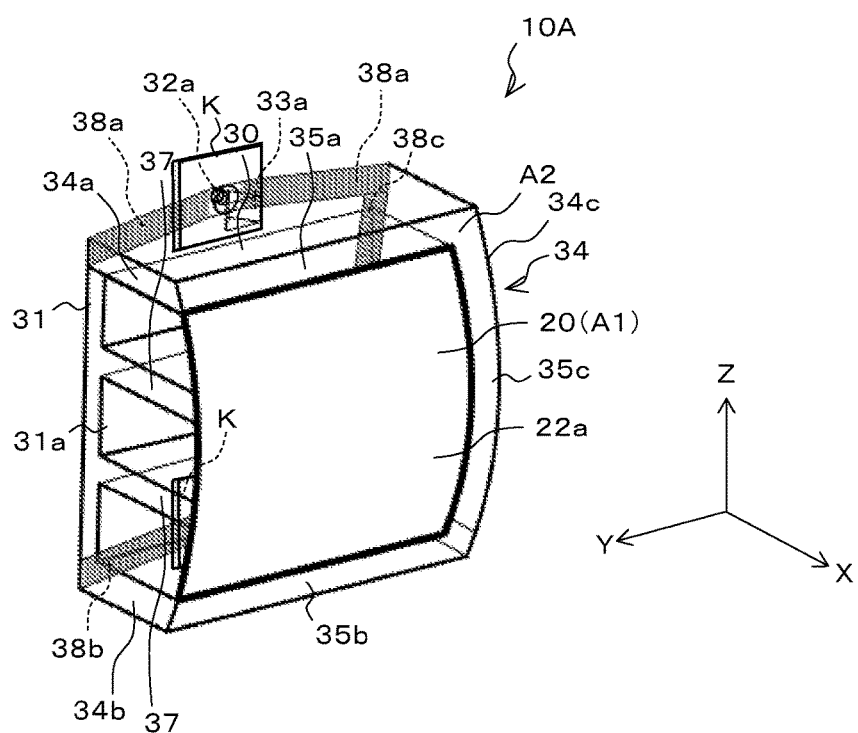
FIG. 7 is a perspective view of a vehicular lamp 10A (modification example) as viewed from the front side.

FIG. 7 is a perspective view of the vehicular lamp 10A (modification example) as viewed from the front side. FIG. 8A is a top view of the vehicular lamp 10A, FIG. 8B is a front view, and FIG. 8C is a side view.

As illustrated in FIG. 7 and FIGS. 8A to 8C, a light incident surface 32a is provided substantially at the center of the upper edge portion of the rear surface 31b of the transparent plate 31. A first reflecting surface 33a is provided in front thereof.

The first reflecting surface 33a is configured as a surface that internally reflects (total reflection) the light from the light source 40a, which has entered the transparent plate 31 from the light incident surface 32a, toward the edge portion (in the present modification, the left edge portion and the right edge portion in FIG. 8A) of the transparent plate 31.

Further, a pair of left and right reflecting surfaces 38a, each internally reflecting the reflected light from the first reflecting surface 33a toward the light exit surface 35a, is provided on both sides of the light incident surface 32a at the upper edge portion of the rear surface 31b of the transparent plate 31.

Figure 9:
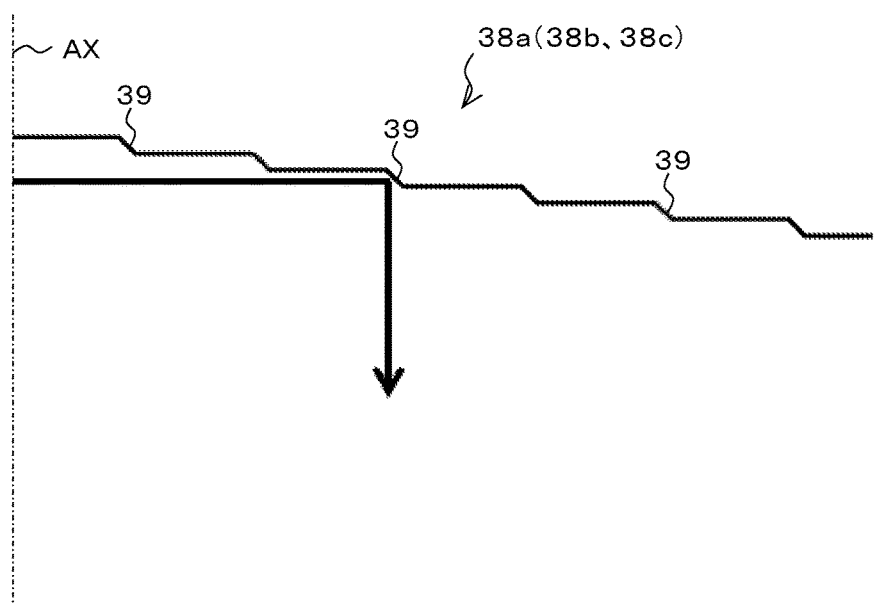
FIG. 9 is an enlarged view of a pair of left and right reflecting surfaces 38a, 38b and a pair of upper and lower reflecting surfaces 38c.

As illustrated in FIG. 9, the pair of left and right reflecting surfaces 38a includes a plurality of individual reflecting surfaces 39 inclined by 45 degrees with respect to the reference axis AX in order to reflect internally the reflected light from the first reflecting surface 33a toward the light exit surface 35a.

Similarly, a light incident surface 32b is provided substantially at the center of the lower edge portion of the rear surface 31b of the transparent plate 31. A first reflecting surface 33b is provided in front thereof.

The first reflecting surface 33b is configured as a surface that internally reflects (total reflection) the light from the light source 40b, which has entered the transparent plate 31 from the light incident surface 32b, toward the edge portion (in the present modification, the left edge portion and the right edge portion in FIG. 8A) of the transparent plate 31.

Further, a pair of left and right reflecting surfaces 38b, each internally reflecting the reflected light from the first reflecting surface 33b toward the light exit surface 35b, is provided on both sides of the light incident surface 32b at the lower edge portion of the rear surface 31b of the transparent plate 31.

As illustrated in FIG. 9, the pair of left and right reflecting surfaces 38b includes a plurality of individual reflecting surfaces 39 inclined by 45 degrees with respect to the reference axis AX in order to reflect internally the reflected light from the first reflecting surface 33b toward the light exit surface 35b.

Similarly, a light incident surface 32c is provided substantially at the center of the right edge portion of the rear surface 31b of the transparent plate 31. A first reflecting surface 33c is provided in front thereof.

The first reflecting surface 33c is configured as a surface that internally reflects (total reflection) the light from the light source 40c, which has entered the transparent plate 31 from the light incident surface 32c, toward the edge portion (in the present modification, the upper edge portion and the lower edge portion in FIG. 8B) of the transparent plate 31.

Further, a pair of upper and lower reflecting surfaces 38c, each internally reflecting the reflected light from the first reflecting surface 33c toward the light exit surface 35c, is provided on both sides of the light incident surface 32c at the right edge portion of the rear surface 31b of the transparent plate 31.

As illustrated in FIG. 9, the pair of upper and lower reflecting surfaces 38c includes a plurality of individual reflecting surfaces 39 inclined by 45 degrees with respect to the reference axis AX in order to reflect internally the reflected light from the first reflecting surface 33c toward the light exit surface 35c.

In the vehicular lamp 10A having the abovementioned configuration, where the light sources 40a, 40b, 40c are turned on, light (red light) from each of the light sources 40a, 40b, 40c enters from the light incident surfaces 32a, 32b, 32c of the transparent member 30 and is then internally reflected by the first reflecting surfaces 33a, 33b, 33c toward the upper edge portion, the lower edge portion, the right edge portion, and the left edge portion of the transparent plate 31, and is further internally reflected by the pair of left and right reflecting surfaces 38a, 38b (that is, a plurality of individual reflecting surfaces 39) and the pair of upper and lower reflecting surfaces 38c (that is, a plurality of individual reflecting surfaces 39) toward the light exit surfaces 35a, 35b, 35c. As a result, the light exits from the U-shaped light exit surface (light exit surfaces 35a, 35b, 35c) and is radiated forward. A stop lamp is thus realized.

According to this modification example, more intense light can be caused to exit from the light exit surfaces 35a, 35b, 35c as compared with the abovementioned embodiment.

Figure 10A:
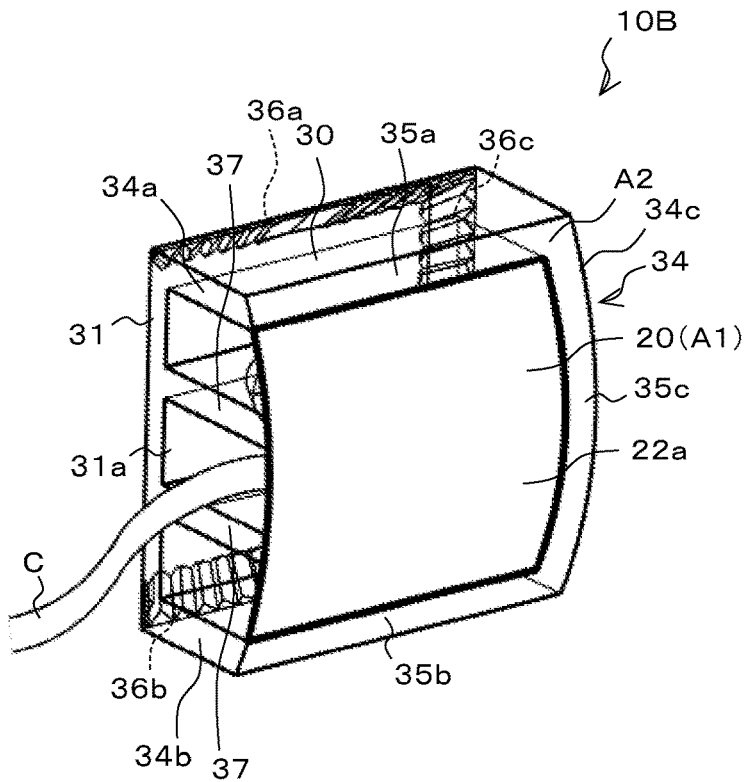
FIGS. 10A and 10B are perspective views of a vehicular lamp 10B (modification example) in which a light source 40 is disposed on a front surface 31a side of a transparent plate 31.
Figure 10B:
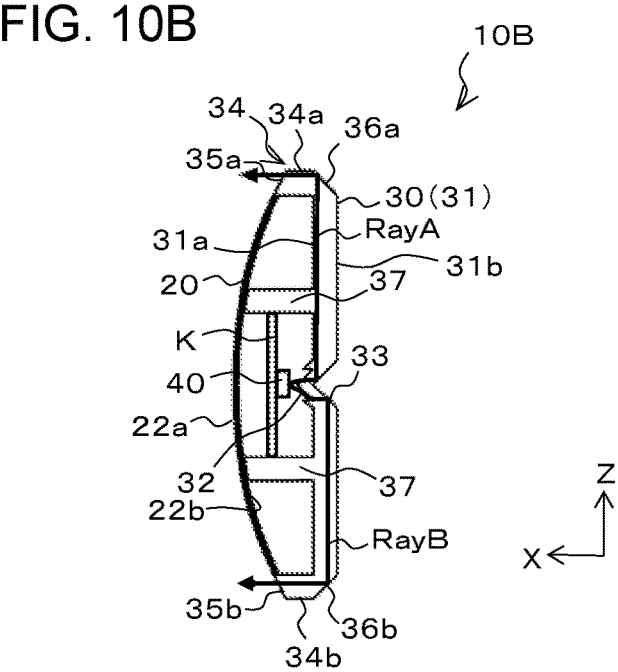

FIGS. 10A and 10B are perspective views of a vehicular lamp 10B (modification example) in which the light source 40 is disposed on the front surface 31a side of the transparent plate 31.

In the abovementioned embodiment, an example is described in which, as illustrated in FIGS. 2A to 2C, the light incident surface 32 is provided on the rear surface 31b of the transparent plate 31, the first reflecting surface 33 is provided on the front surface 31a of the transparent plate 31, and the light source 40 is fixed to the housing or the like in a state in which the light source 40 (light-emitting surface) and the light incident surface 32 are opposed to each other, but the present invention is not limited to this configuration.

For example, a configuration may be used in which, as illustrated in FIGS. 10A and 1013, the light incident surface 32 is provided on the front surface 31a of the transparent plate 31, the first reflecting surface 33 is provided on the rear surface 31b of the transparent plate 31, and the light source 40 (substrate K) is fixed to the transparent member 30 in a state in which the light source 40 (light-emitting surface) and the light incident surface 32 are opposed to each other. This makes it possible to shorten the size of the vehicular lamp 10B in the X axis direction as compared with the abovementioned embodiment in which the light source 40 is disposed on the rear surface 31b side of the transparent plate 31.

Further, as illustrated in FIGS. 10A and 10B, a power supply cable C for supplying electric power to the organic EL panel 20 is led out from the side surface of the transparent member 30 which is not surrounded by the upper edge extension portion 34a, the lower edge extension portion 34b, and the right edge extension portion 34c.

In the abovementioned embodiment, an example is described in which the vehicular lamp of the present invention is applied to an indicator lamp (or a signal lamp) functioning as a tail lamp and a stop lamp, but the present invention is not limited to this configuration. For example, the vehicular lamp of the present invention may be applied to an indicator lamp (or a signal lamp) functioning as a tail lamp and a stop lamp or other vehicular lamps.

In the abovementioned embodiment, an example is described in which a flexible type organic EL panel having flexibility is used as the organic EL panel 20, but the present invention is not limited to this configuration. For example, a glass substrate type organic EL panel (not illustrated) including a front surface that includes a light-emitting surface, a rear surface on the side opposite thereto, and a glass plate covering at least the front surface may be used as the organic EL panel 20. In the case of using a glass substrate type organic EL panel having no (or almost no) flexibility, the intermediate extension portion 37 may be omitted.

The glass substrate type organic EL panel may be bent as illustrated in FIGS. 3A and 3B to FIGS. 5A to 5D, or it may have a planar shape (not illustrated).

Further, in the abovementioned embodiment, an example is described in which the first holding portion 34a1 and the second holding portion 34b1 (see FIGS. 3A and 3B) and the first groove portion 34a2 and the second groove portion 34b2 (See FIGS. 4A and 4B) are used as the holding portion 50 for holding the organic EL panel 20, but the present invention is not limited to this configuration. For example, known means such as a screw or an adhesive may be used as the holding portion 50.

Further, in the abovementioned embodiment, an example is explained in which a semiconductor light-emitting element such as an LED or LD is used as the light source 40, but the present invention is not limited to this configuration, and other light sources such as a bulb light source may be used.

In the abovementioned embodiment, an example is explained in which two intermediate extension portions 37 are used. However, the present invention is not limited to this configuration, and one or three or more intermediate extension portions 37 may be used.

Figure 11A:
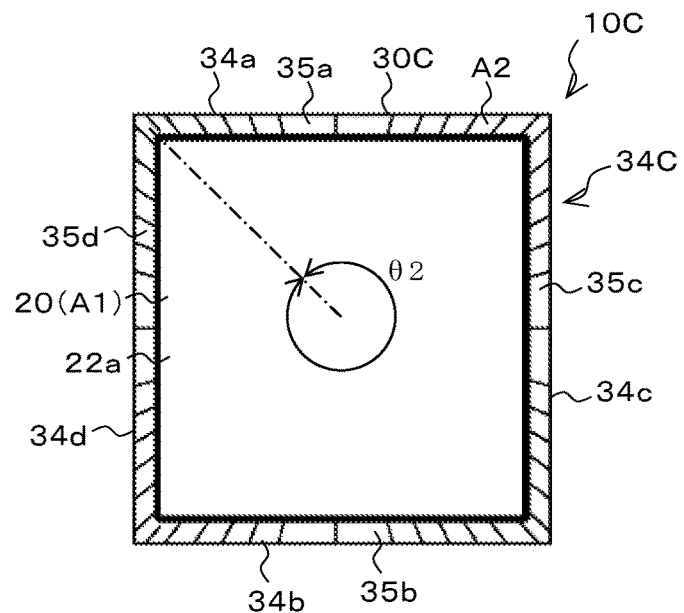
FIG. 11A is a front view of a vehicular lamp 10C (modification example) using another transparent member 30C.
Figure 11B:
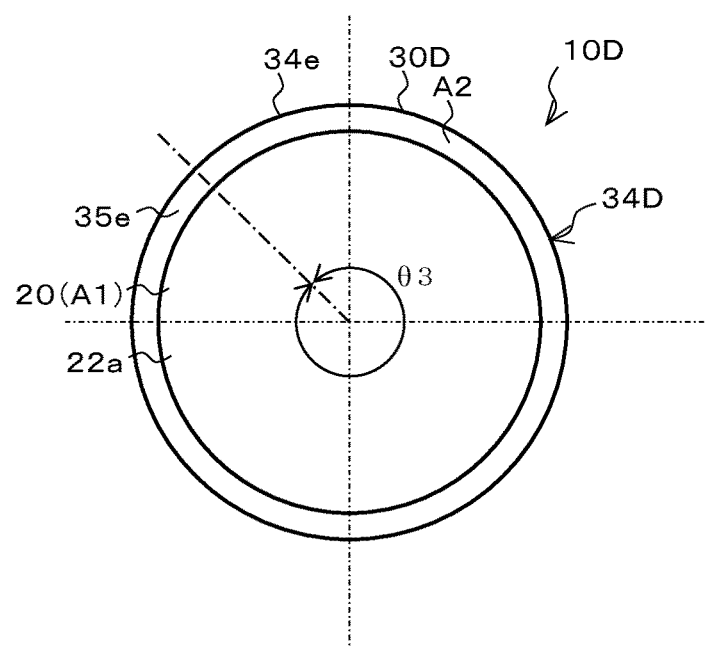
FIG. 11B is a front view of a vehicular lamp 10D (modification example) using another transparent member 30D.

FIG. 11A is a front view of a vehicular lamp 10C (modification example) using another transparent member 30C, and FIG. 11B is a front view of a vehicular lamp 10D (modification example) using another transparent member 30D.

In the abovementioned embodiment, an example is explained in which the U-shaped extension portion 34 (the upper edge extension portion 34a, the lower edge extension portion 34b, and the right edge extension portion 34c) is used, but the present invention is not limited to this configuration. For example, as illustrated in FIG. 11A, it is also possible to use a □-shaped extension portion 34C additionally including a left edge extension portion 34d similar to the right edge extension portion 34c.

In this case, the first reflecting surface 33 is provided in the range of the angle θ2 illustrated in FIG. 11A and a second reflecting surface (not illustrated) that internally reflects the reflected light from the first reflecting surface 33 toward the light exit surface 35d is provided at the left edge portion of the rear surface 31b of the transparent plate 31. As a result, the light from the light source 40 can be caused to exit from the □-shaped light exit surface (light exit surfaces 35a, 35b, 35c, 35d). A stop lamp is thus also realized.

Further, for example, at least one of the upper edge extension portion 34a, the lower edge extension portion 34b, the right edge extension portion 34c, and the left edge extension portion 34d may be omitted.

Further, in the abovementioned embodiment, an example is explained in which the organic EL panel 20, the transparent plate 31, and the U-shaped extension portion 34 have the rectangular outer shape, but the present invention is not limited to this configuration. For example, as illustrated in FIG. 11B, the organic EL panel 20 and the transparent plate 31 (omitted in FIG. 11B) having a circular or elliptical outer shape and an annular extension portion 34D may be used.

In this case, the first reflecting surface 33 is provided in the range of the angle θ3 illustrated in FIG. 11B and an annular reflecting surface (not illustrated) that internally reflects the reflected light from the first reflecting surface 33 toward an annular light exit surface 35e is provided at the peripheral edge portion of the rear surface 31b of the transparent plate 31. As a result, the light from the light source 40 can be caused to exit from the annular light exit surface 35e. A stop lamp is thus also realized.

Further, in the abovementioned embodiment, an example is explained in which the organic EL panel 20 is held on the transparent member 30 in a bent state, but the present invention is not limited to this configuration. For example, although not illustrated, by making the length of the intermediate extension portion 37 equal (or substantially equal) to the length of the U-shaped extension portion 34 (the upper edge extension portion 34a, the lower edge extension portion 34b, and the right edge extension portion 34c), it is possible to hold the organic EL panel 20 in a state of a planar shape, rather than in a bent state.

All the numerical values in the embodiments above are exemplary, and it goes without saying that appropriate numerical values different therefrom can be used.

The above embodiments are merely simple examples in all respects. The present invention is not to be interpreted limitedly by the description of the embodiments. The invention may be embodied in various other forms without departing from the spirit thereof or principal features.

What is claimed is:

1. A vehicular lamp comprising:
   a surface emitting light source including a front surface that includes a light-emitting surface, and a rear surface on the side opposite thereto;
   a transparent member including at least one light incident surface, a light exit surface from which light entering from the light incident surface exits, a light guide portion for guiding the light entering from the light incident surface to the light exit surface, and a holding portion for holding the surface emitting light source; and
   at least one light source that emits light which enters from the light incident surface, is guided to the light exit surface by the light guide portion, and exits from the light exit surface, wherein
   the transparent member includes a transparent plate including a front surface and a rear surface on the side opposite thereto,
   the surface emitting light source is disposed in front of the transparent member in a state in which the rear surface of the surface emitting light source and the front surface of the transparent plate are opposite each other, and
   the front surface of the transparent plate is provided with a first extension portion extending forward from the front surface and having a distal end portion provided with the light exit surface.

2. The vehicular lamp according to claim 1, wherein the front surface of the transparent plate is further provided with a second extension portion extending forward from the front surface and having a distal end portion in contact with the rear surface of the surface emitting light source.

3. The vehicular lamp according to claim 2, wherein the surface emitting light source is held in a state in which at least a part of an end portion of the surface emitting light source is in contact with the first extension portion, and the rear surface of the surface emitting light source is in contact with the distal end portion of the second extension portion.

4. The vehicular lamp according to claim 1, wherein
   one of the front surface and the rear surface of the transparent plate is provided with the light incident surface, and the other of the front surface and the rear surface of the transparent plate is provided with a first reflecting surface that internally reflects the light from the light source, which has entered from the light incident surface, toward an edge portion of the transparent plate, the edge portion of the transparent plate is provided with a second reflecting surface that internally reflects the reflected light from the first reflecting surface toward the light exit surface, and the first reflecting surface, the transparent plate, the second reflecting surface, and the first extension portion function as the light guide portion.

5. The vehicular lamp according to claim 1, wherein the surface emitting light source is held in a bent state.

6. The vehicular lamp according to claim 1, wherein the surface emitting light source has flexibility.

7. The vehicular lamp according to claim 1, wherein the surface emitting light source is opaque.

8. The vehicular lamp according to claim 1, wherein the light exit surface is disposed along at least a part of an outer shape of the surface emitting light source.

9. The vehicular lamp according to claim 1, further comprising an additional transparent member that is held on the transparent member in a state of covering the light-emitting surface of the surface emitting light source.

10. The vehicular lamp according to claim 1, wherein the surface emitting light source is an organic EL panel.

11. The vehicular lamp according to claim 1, wherein the at least one light incident surface comprises a plurality of light incident surfaces;

the at least one light source comprises a plurality of light sources;

the plurality of light sources are arranged corresponding to the plurality of light incident surfaces respectively.

12. The vehicular lamp according to claim 6, wherein the surface emitting light source is held in a state of being bent convexly forward.

13. The vehicular lamp according to claim 6, wherein the surface emitting light source is held in a state of being bent concavely forward.

14. The vehicular lamp according to claim 8, wherein the light exit surface of the transparent member is arranged around the surface emitting light source in a state surrounding the light-emitting surface of the surface emitting light source.

* * * * *